US012780134B2

(12) United States Patent
Guzman-Magana et al.

(10) Patent No.: US 12,780,134 B2
(45) Date of Patent: Nov. 3, 2026

(54) VEHICLE FRONT FASCIA HAVING A CONCEALED BREATHER

(71) Applicant: FCA US LLC, Auburn Hills, MI (US)

(72) Inventors: Arturo Guzman-Magana, LaSalle (CA); Sreekanth Surapaneni, Oakland, MI (US); Prathap Krishnan, Chennai (IN); Venkata Chagarlamudi, Rochester Hills, MI (US); Tracy Schmidt, Fenton, MI (US)

(73) Assignee: FCA US LLC, Auburn Hills, MI (US)

(*) Notice: Subject to any disclaimer, the term of this patent is extended or adjusted under 35 U.S.C. 154(b) by 323 days.

(21) Appl. No.: 18/417,202

(22) Filed: Jan. 19, 2024

(65) Prior Publication Data

US 2025/0236252 A1 Jul. 24, 2025

(51) Int. Cl.
*B60R 19/52* (2006.01)
*B60K 11/08* (2006.01)

(52) U.S. Cl.
CPC .............. *B60R 19/52* (2013.01); *B60K 11/08* (2013.01)

(58) Field of Classification Search
CPC ........... B60R 19/52; B60R 5/02; B60R 19/12; B60K 11/08; B60K 11/06; B60K 2001/006; B60K 15/05
USPC ...................................................... 296/181.5
See application file for complete search history.

(56) References Cited

U.S. PATENT DOCUMENTS

| | | | | |
|---|---|---|---|---|
| 8,708,075 B2 * | 4/2014 | Maurer | B60K 11/08 180/68.1 |
| 2002/0096378 A1 * | 7/2002 | Kobayashi | B60K 11/08 180/68.6 |
| 2019/0329645 A1 * | 10/2019 | Wolf | B62D 35/02 |
| 2022/0242360 A1 * | 8/2022 | Glickman | B62D 65/16 |

FOREIGN PATENT DOCUMENTS

| | | | | |
|---|---|---|---|---|
| CN | 116811564 A * | 9/2023 | B60K 11/085 |
| JP | 07158442 A * | 6/1995 | |
| JP | 4038760 B2 * | 1/2008 | |

* cited by examiner

*Primary Examiner* — Amy R Weisberg
*Assistant Examiner* — Philip C Adams
(74) *Attorney, Agent, or Firm* — Jeremy J. Klobucar

(57) ABSTRACT

A vehicle including a front fascia and a breather provided in the front fascia that is concealed from view. The breather defines an elongated opening provided in the fascia that includes an upper assembly defining an upper edge of the elongated opening and a lower assembly that defines a lower edge of the elongated opening, and the upper edge overhangs the lower edge to conceal the elongated opening from view.

10 Claims, 8 Drawing Sheets

VEHICLE FRONT FASCIA HAVING A CONCEALED BREATHER

FIELD

The present disclosure relates to a vehicle front fascia having a concealed breather.

BACKGROUND

This section provides background information related to the present disclosure which is not necessarily prior art.

Combining styling and performance is an important aspect of vehicle design. In this regard, there is a desire for providing vehicles having improved aerodynamic performance without sacrificing an aesthetic appeal of the vehicle. Moreover, regardless whether the vehicle is an electrically-powered vehicle, an internal combustion-powered vehicle, or a hybrid vehicle, there is need to provide air to an interior of the power supply compartment for various features of the vehicle such as, for example, the vehicle HVAC system. The present disclosure provides a vehicle having improved aerodynamic performance without sacrificing aesthetic appeal, while also being able to increase the amount of air that can enter the power supply compartment of the vehicle.

SUMMARY

This section provides a general summary of the disclosure, and is not a comprehensive disclosure of its full scope or all of its features.

According to an aspect of the present disclosure, there is provided a vehicle including a front fascia; and a breather provided in the front fascia that is concealed from view, the breather defining an elongated opening provided in the fascia that includes an upper assembly defining an upper edge of the elongated opening and a lower assembly that defines a lower edge of the elongated opening, the upper edge overhanging the lower edge to conceal the elongated opening from view.

According to the aspect, the fascia includes an upper panel, an intermediate panel, and a lower panel, and the breather is provided in the intermediate panel provided between the upper panel and the lower panel.

According to the aspect, the elongated opening extends across a width of the front fascia in a Y-direction, and the upper edge is spaced apart from the lower edge in an X-direction and a Z-direction.

According to the aspect, the upper edge is spaced apart form the lower edge in a positive Z-direction or a negative Z-direction.

According to the aspect, the lower assembly includes an inwardly extending flange and a downwardly extending section, a corner between the inwardly extending flange and the downwardly extending section defining the lower edge of the elongated opening.

According to the aspect, the inwardly extending flange extends substantially orthogonal to the downwardly extending section.

According to the aspect, the inwardly extending flange extends downwardly relative to the downwardly extending section.

According to the aspect, the inwardly extending flange extends upwardly relative to the downwardly extending section.

According to the aspect, the upper assembly includes an angled section and an inwardly extending flange connected to the angled section, a corner between the angled section and the inwardly extending flange defining the upper edge of the elongated opening.

According to the aspect, the upper edge overhanging the lower edge is configured to collect and direct air into the elongated opening.

According to the aspect, the breather is configured to collect and direct in an amount that ranges between 959 to about 2144 cubic feet per minute.

According to the aspect, the front fascia further comprises an upper grill and a lower grill each configured to permit air to pass therethrough.

According to the aspect, the front fascia does not include an upper grill or a lower grill configured to permit air to pass therethrough.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 schematically illustrates an example vehicle according to a principle of the present disclosure;

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
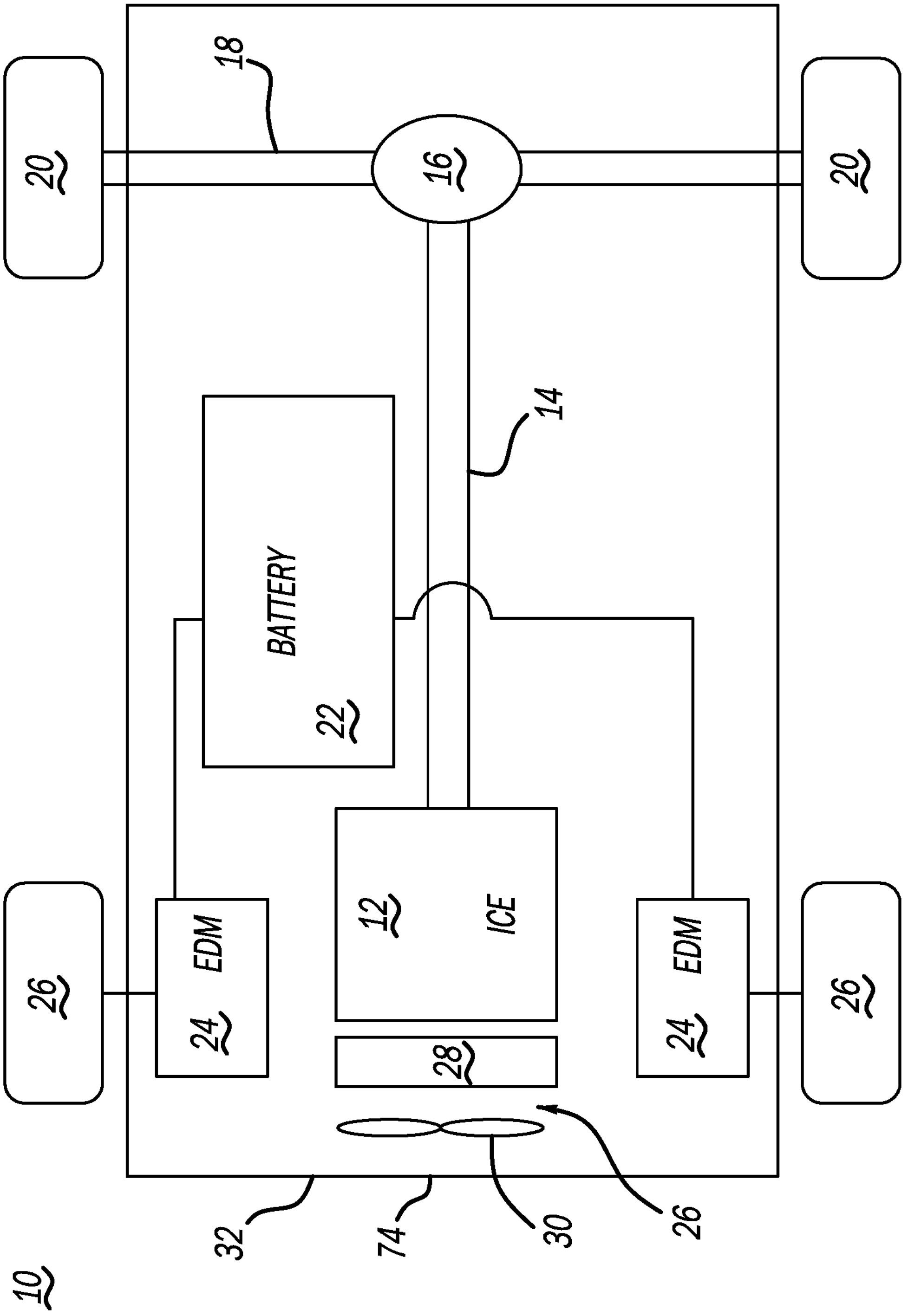

FIG. 1 schematically illustrates an example vehicle 10 according to a principle of the present disclosure. Vehicle 10 may be an internal-combustion-powered vehicle, a battery-powered-electric vehicle, or a hybrid vehicle. In the illustrated embodiment, a hybrid vehicle is illustrated having an internal combustion engine (ICE) 12 that drives a drive shaft 14 that is connected to a power transfer module 16 (i.e., differential). Power transfer module 16 is configured to transfer energy provided by drive shaft 14 to a rear axle assembly 18 that rotates at least one of the rear wheels 20 connected thereto.

Vehicle 10 is also illustrated as having a battery module 22 that may include a plurality of battery cells (not shown) located therein. Battery module 22 provides electric power to a pair of electric drive motors 24 that are respectively configured to rotate a respective front wheel 26 of vehicle 10. While a pair of electric drive motors 24 are illustrated, it should be understood that only a single electric drive motor 24 can be used without departing from the scope of the present disclosure.

If vehicle 10 is only powered using ICE 12, battery module 22 and electric drive motors 24 may be removed. In such an instance, ICE 12 can be used to drive front wheels 26 rather than rear wheels 20, if desired. Similarly, if vehicle 10 is only powered using battery module 22 and electric drive motors 24, ICE 12, drive shaft 14, and power transfer module 16 may be removed. In such an instance, additional electric drive motors 24 can be provided at rear wheels 20 or electric drive motors 24 can only be provided at rear wheels 20, if desired.

Regardless of the manner in which vehicle 10 is powered, it should be understood that vehicle 10 includes an HVAC system 26 including at least a condenser 28 and a fan 30 for drawing air toward condenser 28 to exchange heat with a refrigerant passing through condenser 28 to cool a cabin (not shown) of vehicle 10. While fan 30 can be operated to draw air toward condenser 28 when vehicle 10 is moving or stopped, it is preferable that fan 30 only operate when vehicle 10 is stopped or moving at slow speeds (e.g., less than 15 mph). In this regard, inasmuch as HVAC system 26 is preferably provided at a front 32 of vehicle 10, air that enters a front fascia 34 (FIG. 2) when the vehicle 10 is moving at greater speeds (e.g., greater than 15 mph) can pass through condenser 28 without assistance from fan 30. The front 32 of vehicle 10 illustrated in FIG. 2 includes a front fascia 34 having an elongated opening or breather 36 that is sized and shaped to enhance the volumetric flow of air through the fascia 34 towards condenser 28 without increasing aerodynamic drag on vehicle 10. In addition, it should be understood that breather 36 is designed so as to be relatively hidden from view to improve the aesthetic appearance of front fascia 34.

Figure 2:
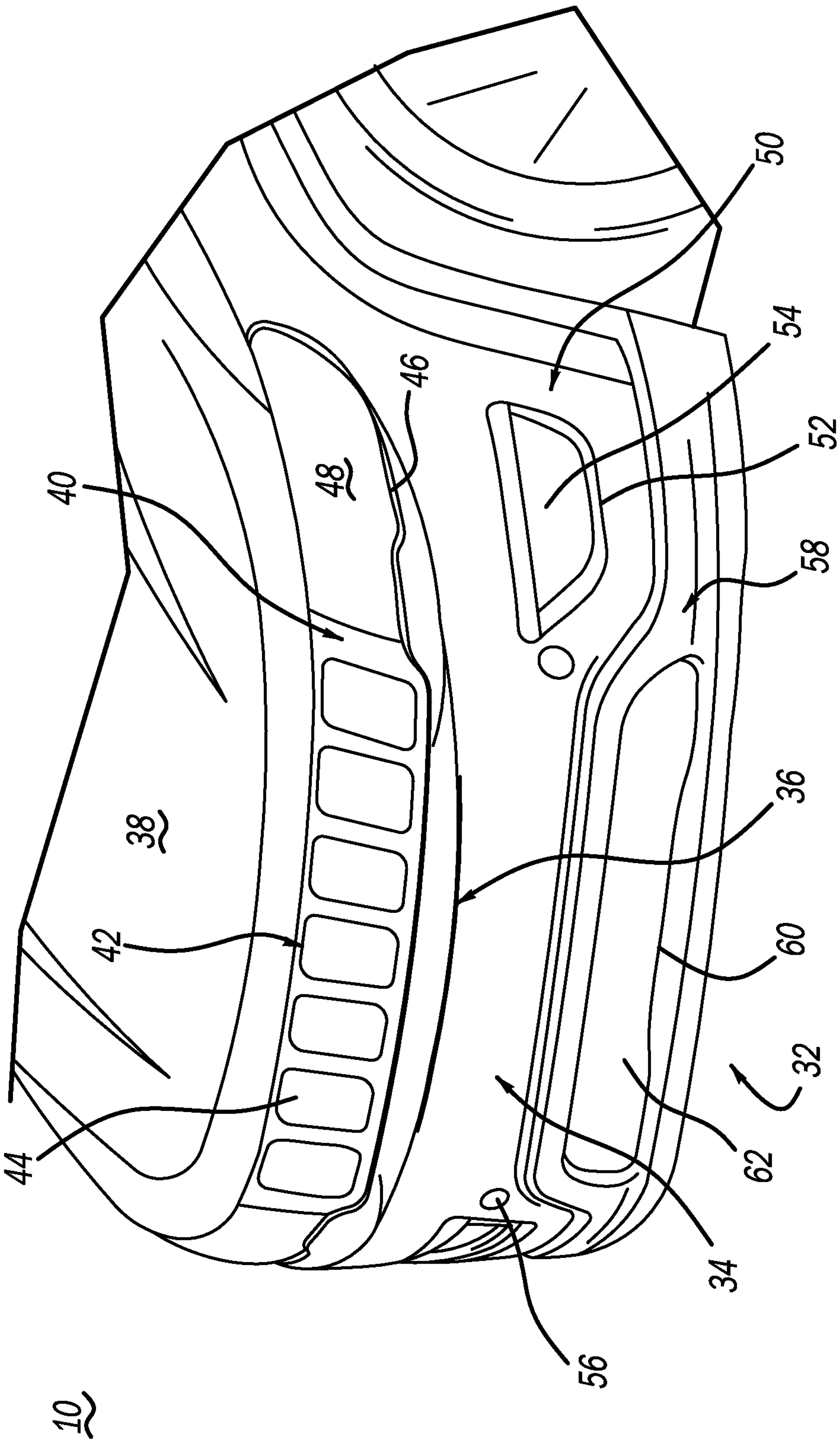
FIG. 2 is a perspective side view of a front fascia having a breather opening according to a principle of the present disclosure.
Figure 3:
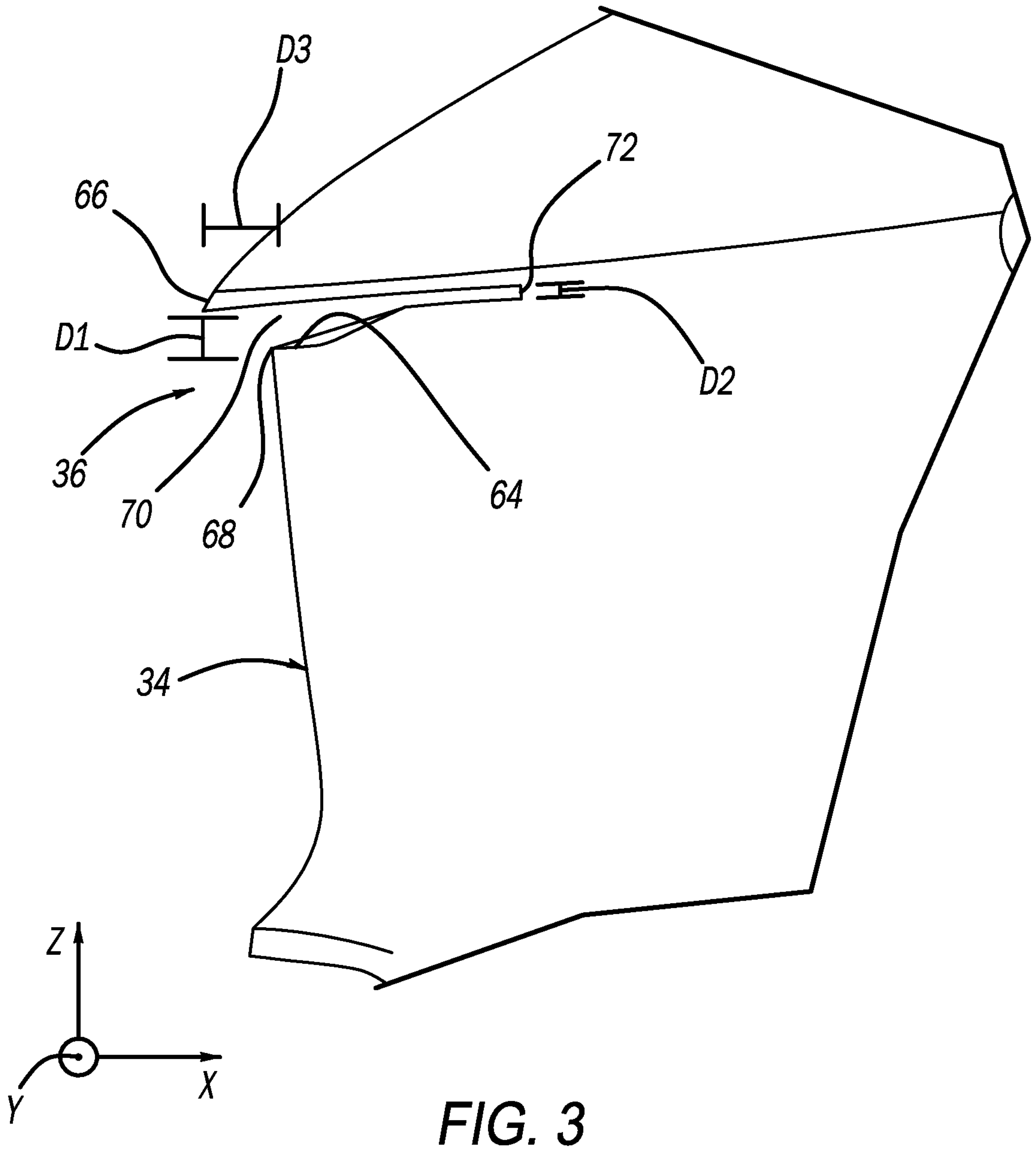
FIG. 3 is side perspective view of a front fascia having a breather.

More particularly, now referring to FIG. 2, it can be seen that front 32 of vehicle 10 includes a hood 38 that encloses an engine compartment (not shown) of vehicle 10 and fascia 34. Fascia 34 includes an upper panel 40 that includes an optional upper grill 42 having a plurality of perforated openings 44 that permit air to enter the engine compartment and apertures 46 configured for receipt of a pair of vehicle headlights 48. Fascia 34 also includes an intermediate panel 50 that includes breather 36 as well openings 52 that are configured for receipt of either perforated panels 54 or fog lights (not shown). Intermediate section 50 may include various sensors 56 such as, for example, parking assist sensors, cruise control sensors, or other sensors known to one skilled in the art. Fascia 34 may also include a lower panel 58 that includes an optional elongated opening 60 configured for receipt of a lower grill 62, which can be an apertured panel. In the illustrated embodiment, as noted above, breather 36 is provided in intermediate panel 50. It should be understood, however, that breather 36 may be located in upper panel 40 or lower panel 58 of fascia 34, without limitation. It should also be understood that fascia 34 is not required to have upper panel 40, intermediate panel 50, and lower panel 58 be separately formed and joined together. In contrast, fascia 34 can be a single panel, if desired, as shown in FIG. 3.

Regardless whether fascia 34 is formed of a single panel or multiple panels, breather 36 is an elongated opening 64 provided in fascia 34 that is configured to receive airflow during movement of vehicle 10 and substantially concealed from view. More particularly, breather 36 includes an upper edge 66, a lower edge 68 spaced apart from the upper edge 66 to define an inlet 70 of breather 36, and a pair of side edges 72 that connect upper edge 66 and lower edge 68. A distance D1 between upper edge 66 and lower edge 68 at a center 74 (see FIG. 1) of front 32 of vehicle 10 in the Z-direction is greater than a distance D2 in the Z-direction at side edges 72. As upper edge 66 extends outward from center 74 in directions (i.e., Y-direction) toward side edges 72, the distance D1 gradually reduces to the lesser distance D2. The distance D1 may generally be in the range of from about 2 cm to about 3 cm, and the distance D2 may generally in the range of from about 0.5 cm to about 1.5 cm.

Breather 36 is generally concealed from view because upper edge 66 is also spaced apart from lower edge 68 by a distance D3 that extends in the X-direction. The distance D3 may generally be in the range of from about 2 cm to about 3 cm. In addition, it can be seen that as upper edge 66 extends outward in the Y-directions away from the center 74 that it slightly moves upward to (i.e., in the Z-direction) to side edges 72. The angle at which upper edge 66 may be angled relative to the X-axis can range between about five degrees to about 10 degrees. Because upper edge 66 is spaced apart from the lower edge 68 in the X-direction and is slightly angled relative to the X-axis, upper edge 66 overhangs lower edge 68, upper edge 66 conceals lower edge 68, and can function as an air scoop that directs air into opening 64.

That is, when vehicle 10 is in motion, air that contacts fascia 34 will generally move in an upward (i.e., the Z-direction) direction along fascia 34 towards hood. Because upper edge 66 is spaced apart from lower edge 68 by the distance D3, however, the air that is traveling upward will be gathered and directed into the engine compartment of vehicle 10 by an interior surface of fascia (best shown in FIGS. 4-10) that overhangs lower edge 68 of breather 36. In this manner, a sufficient volume of air moving at a sufficient velocity can pass through breather 36 and be provided to condenser 28, as well as cool various components of vehicle 10 (e.g., battery pack 22, electric drive modules 24), or be used for combustion if vehicle 10 is provided with ICE 12.

Now referring to FIGS. 4-8, different example configurations of breather 36 are illustrated. In FIGS. 4-8, breather 36 may be formed in intermediate panel 50 of fascia 34, but it should be understood that the breathers 36 may also be formed in a fascia 34 that consists of a single panel, if desired.

Figure 4:
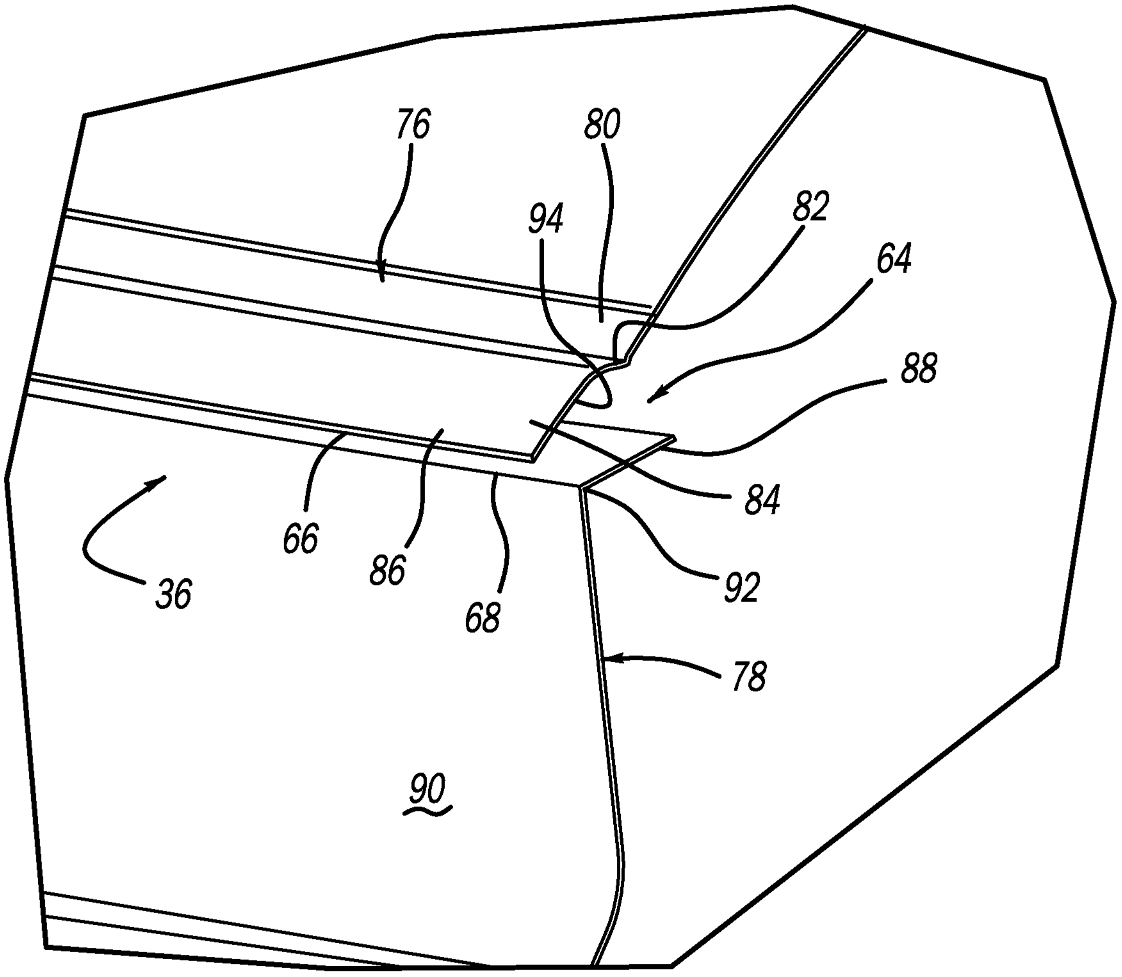
FIGS. 4-8 are perspective cross-sectional views of example front fasciae having a breather opening according to a principle of the present disclosure.

The elongated opening 64 of breather 36 illustrated in FIG. 4 includes an upper assembly 76 that defines upper edge 66 and a lower assembly 78 that defines lower edge 68. Upper assembly 76 includes a first angled section 80, which transitions to a planar section 82, which transitions a second angled section 84, which transitions to a terminal section 86 that defines upper edge 66. Lower assembly 78 includes an inwardly extending flange 88 that is connected to a downwardly extending section 90 at substantially a right angle (i.e., ninety degrees). A corner 92 between inwardly extending flange 88 and downwardly extending section 90 defines lower edge 68. As can be seen in FIG. 4, terminal section 86 overhangs lower edge 68 such that as air travels upward along downwardly extending section 90, the air will be caught and directed through breather 36 by an interior surface 94 of upper assembly 76 into the engine compartment of vehicle 10.

Figure 5:
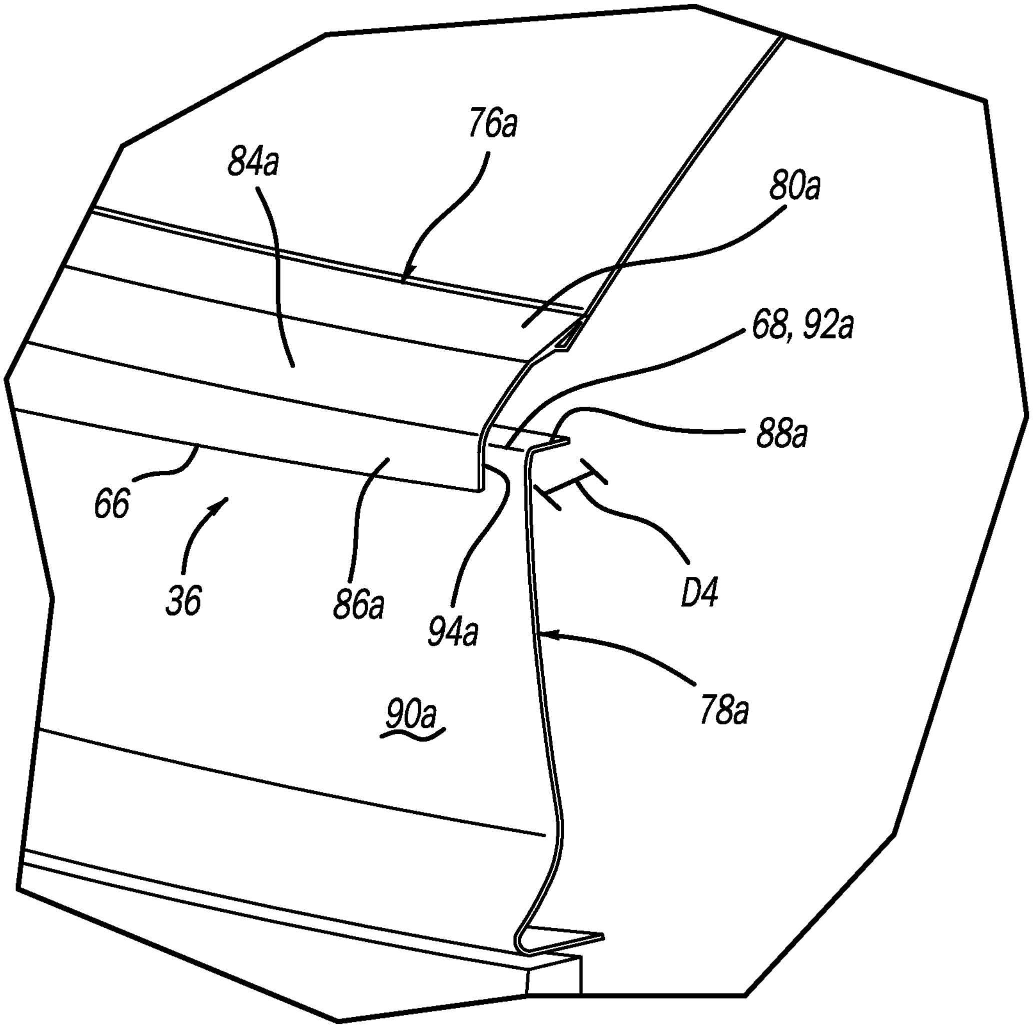

Now referring to FIG. 5, another example configuration for breather 36 is illustrated. Breather 36 includes an upper assembly 76*a* that defines upper edge 66 and a lower assembly 78*a* that defines lower edge 68. Upper assembly 76*a* includes a first angled section 80*a*, which transitions to a second angled section 84*a*, which transitions to downwardly extending terminal section 86*a* that defines upper edge 66. Lower assembly 78*a* includes an inwardly extending flange 88*a* that is connected to a downwardly extending section 90*a* at substantially a right angle (i.e., ninety degrees). A corner 92*a* between inwardly extending flange 88*a* and downwardly extending section 90*a* defines lower edge 68.

As can be seen in FIG. 5, terminal section 86*a* overhangs lower edge 68 such that as air travels upward along downwardly extending section 90, the air will be caught and directed through breather 36 by an interior surface 94*a* of upper assembly 76 into the engine compartment of vehicle 10. In addition, terminal section 86*a* overhangs lower edge 68 in the Z-direction to further conceal the elongated opening 64 of breather 36. Moreover, in the illustrated example embodiment, it should be understood that inwardly extending flange 88*a* does not extend substantially orthogonally to downwardly extending section 90*a*, but rather is downwardly angled to further assist in directing air as it enters breather 36 to the desired location within the engine compartment. It should be understood that a width D4 of inwardly extending flange 88*a* is variable, and can be greater than that shown in FIG. 5. In general, the width D4 of flange 88*a* can range between 1 cm to 4 cm.

Figure 6:
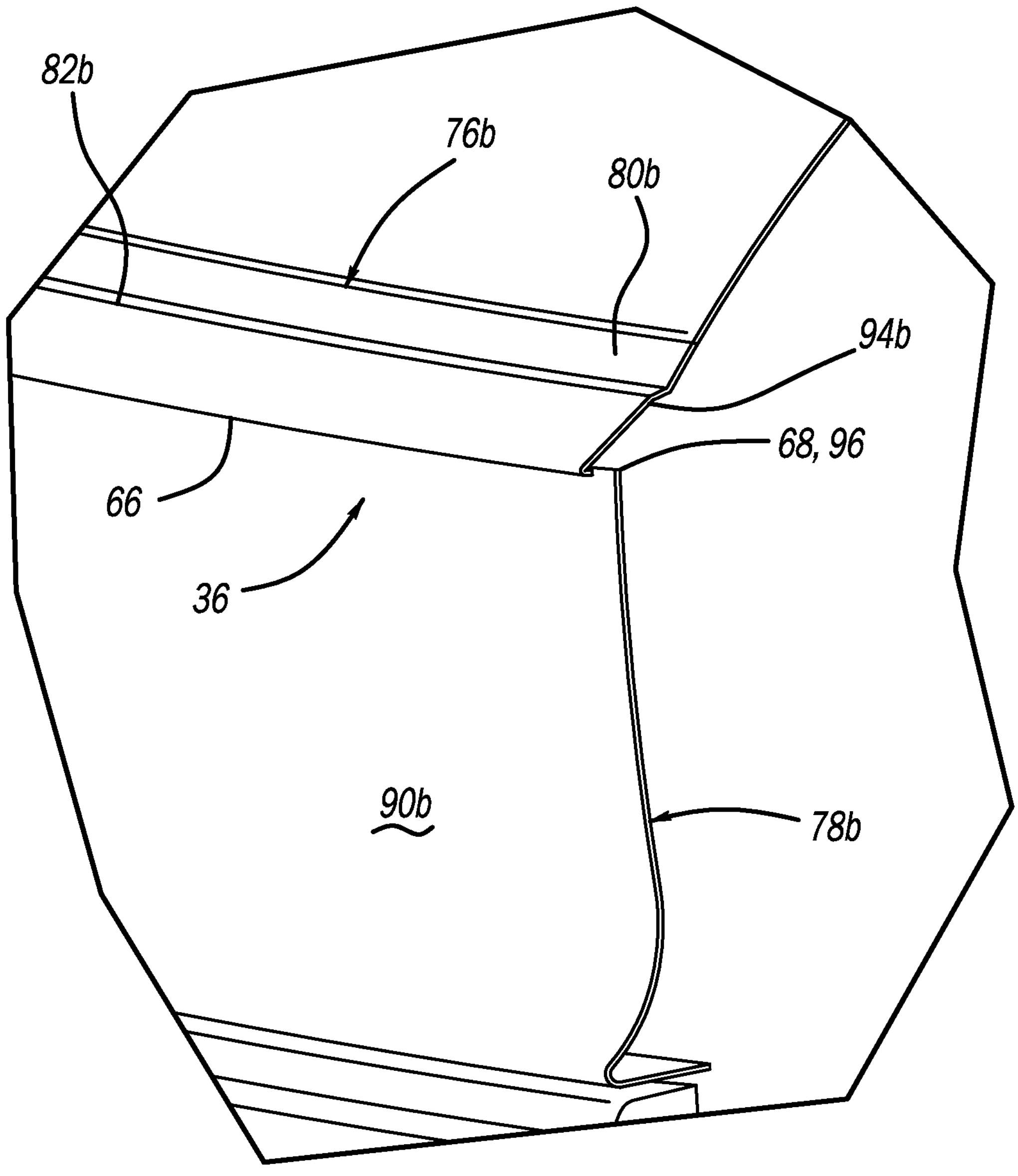

Now referring to FIG. 6, another example configuration for breather 36 is illustrated. The breather 36 illustrated in FIG. 6 includes an upper assembly 76*b* that defines upper edge 66 and a lower assembly 78*b* that defines lower edge 68. Upper assembly 76*b* includes a first angled section 80*b*, which transitions to a planar section 82*b*, which transitions to a second angled section 84*b* that defines upper edge 66. Lower assembly 78*b* includes a downwardly extending section 90*b*, which includes a terminal edge 96 that defines lower edge 68. As can be seen in FIG. 6, second angled section 84*b* overhangs lower edge 68 such that as air travels upward along downwardly extending section 90, the air will be caught and directed through breather 36 by an interior surface 94*b* of upper assembly 76*b* into the engine compartment of vehicle 10.

Figure 7:
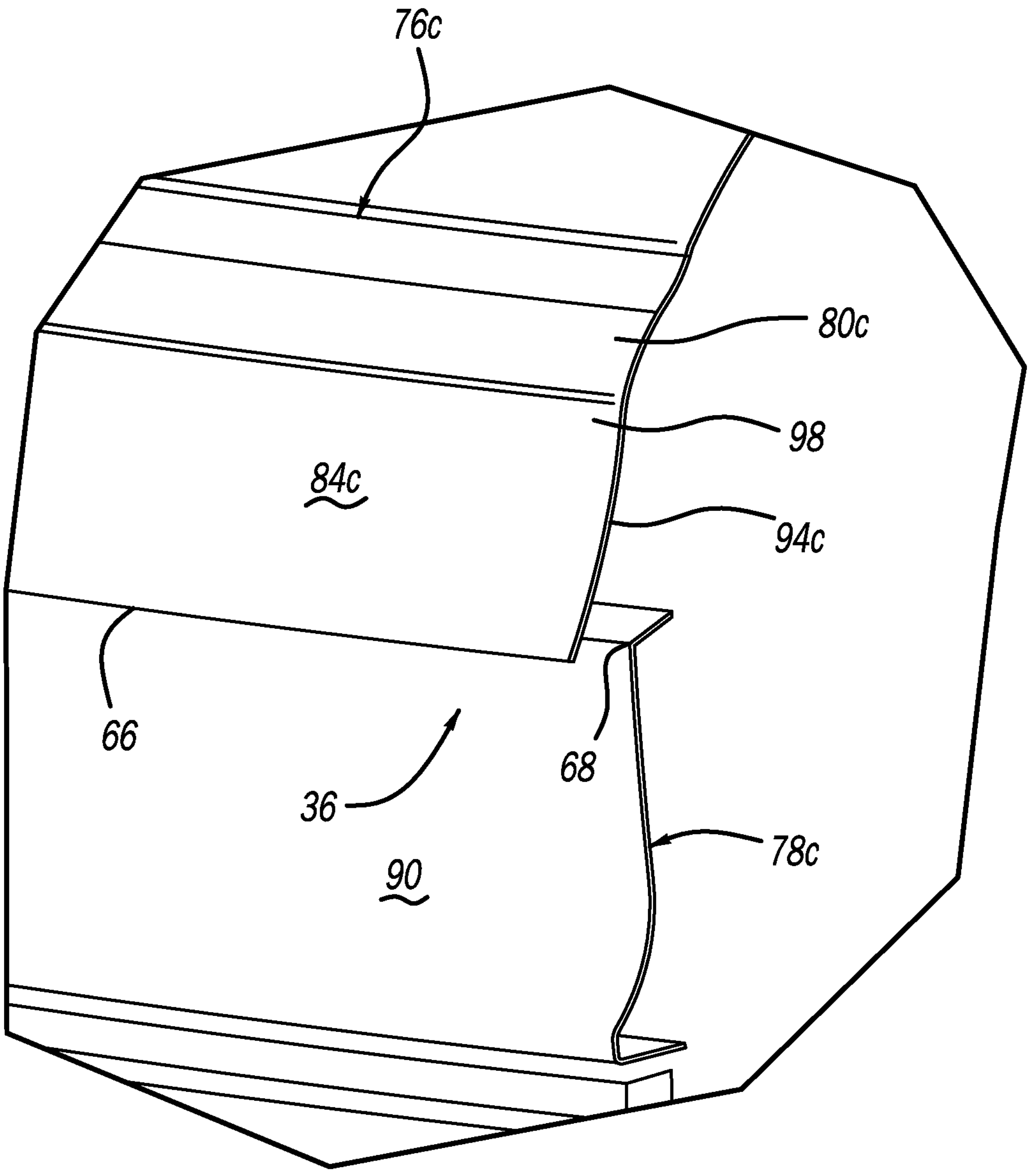

Now referring to FIG. 7, another example configuration for breather 36 is illustrated. The breather 36 illustrated in FIG. 7 includes an upper assembly 76*c* that defines upper edge 66 and a lower assembly 78*c* that defines lower edge 68. Lower assembly 78*c* is substantially similar to that illustrated in FIG. 4 so further description thereof will be omitted. Upper assembly 76*c* includes a first angled section 80*c*, which transitions to a downwardly extending planar section 98, which transitions to a second angled section 84*c* that defines upper edge 66. As can be seen in FIG. 7, second angled section 84*c* overhangs lower edge 68 such that as air travels upward along downwardly extending section 90, the air will be caught and directed through breather 36 by an interior surface 94*c* of upper assembly 76*c* into the engine compartment of vehicle 10.

Figure 8:
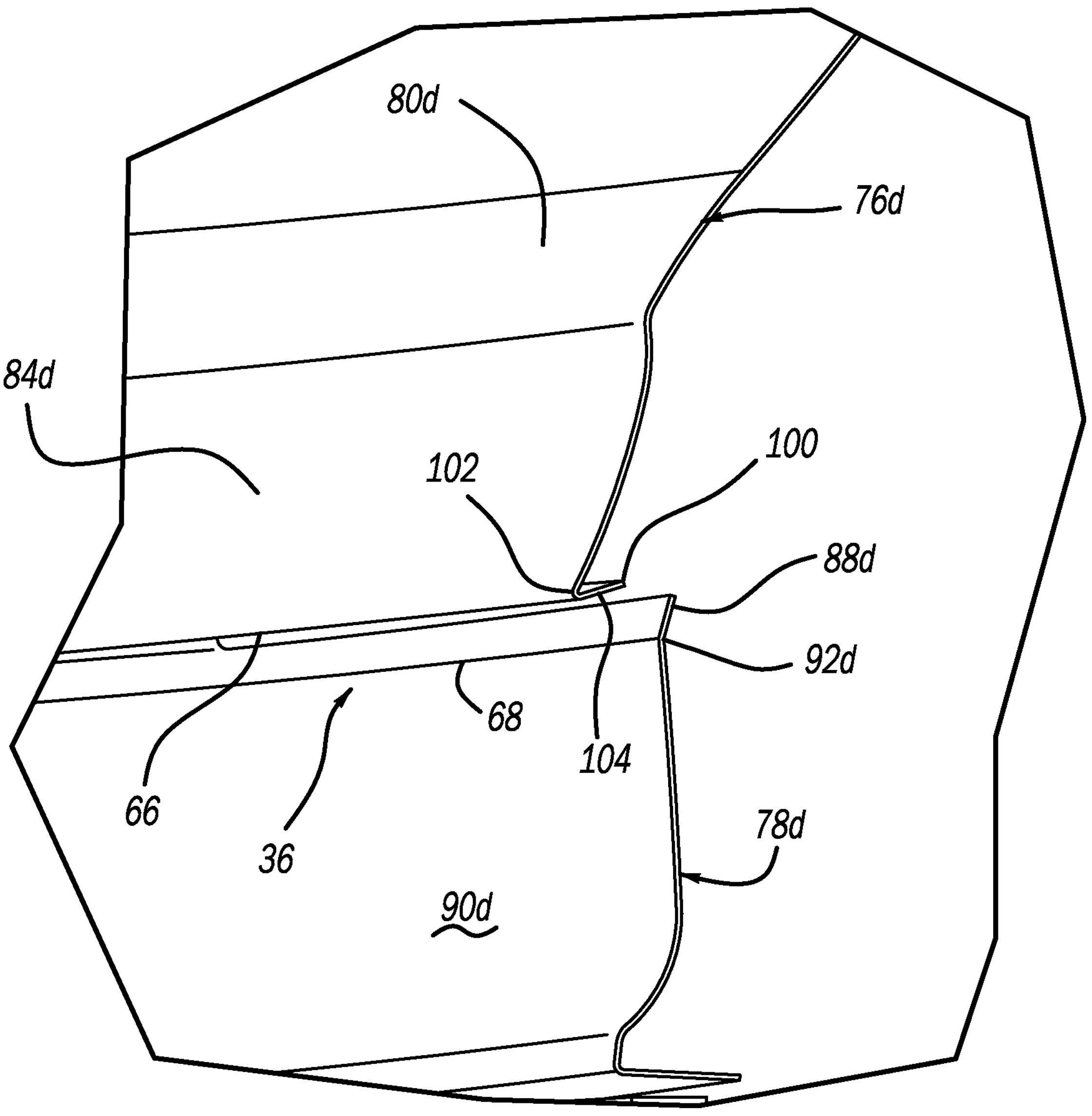

Now referring to FIG. 8, another example configuration for breather 36 is illustrated. Breather 36 includes an upper assembly 76*d* that defines upper edge 66 and a lower assembly 78*d* that defines lower edge 68. Upper assembly 76*d* includes a first angled section 80*d* that transitions to a second angled section 84*d*, which transitions to a second inwardly extending flange 100. A corner 102 between second angled section 84*d* and second inwardly extending flange 100 defines upper edge 66 Lower assembly 78*d* includes an inwardly extending flange 88*d* that is connected to a downwardly extending section 90*d*. Inwardly extending flange 88*d* is not arranged orthogonal to downwardly extending section 90*d* like in FIG. 4, nor downwardly angled like that shown in FIG. 5. In contrast, inwardly extending flange 88*d* is upwardly angled. A corner 92*d* between inwardly extending flange 88*d* and downwardly extending section 90*d* defines lower edge 68.

As can be seen in FIG. 8, second angled section 84*d* and second inwardly extending flange 100 overhangs lower edge 68 such that as air travels upward along downwardly extending section 90*d*, the air will be caught and directed through breather 36 by a bottom surface 104 of second inwardly extending flange 100 of upper assembly 76*d* into the engine compartment of vehicle 10. The upward angle of inwardly extending flange 88*d* directs air as it passes through breather 36 to the desired location of engine compartment of vehicle 10.

In each of the above-described configurations it should be understood that breather 36 has a minimum effect on the aerodynamic properties of fascia 34. Indeed, it was determined using computational fluid dynamic (CFD) testing that the addition of one of breathers 36 illustrated in FIGS. 4-8 to vehicle 10 illustrated in FIG. 2 only negligibly increases the drag coefficient. In this regard, the various breathers 36 illustrated in FIGS. 4-8 only increased the drag coefficient (Cd) by an amount that ranged between 0.002 to 0.013.

What's more, it should be understood that the addition of breather 36 substantially increases the amount of air (cubic feet per minute, CFM) that is able to enter the engine compartment during motion of vehicle 10. In this regard, CFD testing determined that a baseline amount of air that enters engine compartment and passes through condenser 28 for the vehicle 10 illustrated in FIG. 2 without one of the breathers 36 was about 437 CFM. In this instance, the vehicle 10 was considered to be traveling at 70 miles per hour and the fan 30 was not operating. When vehicle 10 was modified to include one of the breathers 36 illustrated in FIGS. 4-8 and tested under the same conditions, the amount of air that passed through condenser 28 ranged between about 959 CFM to about 2144 CFM. Thus, the use of breathers 36 substantially increases the amount of air that can pass through condenser 28 without negatively affecting the aerodynamic properties of vehicle 10.

In addition, as noted above, the breathers 36 according to the present disclosure are substantially concealed due to the arrangement between the upper assemblies and lower assemblies of breathers 36. Inasmuch as the breathers 36 are substantially concealed from view, the use of breathers 36 does not negatively affect the aesthetic appearance of vehicle 10. Moreover, to the extent that the upper and lower grilles illustrated in FIG. 2 are optional in light of the amount of increased airflow that can be generated by breathers 36, the aesthetic appearance of vehicle 10 can be more akin to an electric vehicle that does not include these features, which may be desirable to various customers as battery powered electric vehicles become more prevalent. Put another way, even if vehicle 10 includes ICE 12, the fascia 34 does not require the upper and lower grills to provide air into the passenger compartment for combustion when fascia 34 includes breather 36 due to the increased amount of air flow provided by breather 36.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a front fascia;

a breather provided in the front fascia that is concealed from view; and an upper grill and a lower grill each provided in the front fascia, and each configured to permit air to pass therethrough;

wherein the breather is positioned between the upper grill and the lower grill, and is defined by an elongated opening provided in the fascia that includes an upper assembly defining an upper edge of the elongated opening, a lower assembly that defines a lower edge of the elongated opening, and a pair of side edges that connect the upper edge and the lower edge, the upper edge overhangs the lower edge to conceal the elongated opening from view, a distance D1 between the upper edge and the lower edge at a center of the front fascia in a Z-direction is greater than a distance D2 in the Z-direction at the side edges of the breather, and a ratio of the distance D1 between the upper edge and the lower edge of the breather at the center of the front fascia to the distance D2 in the Z-direction at the side edges of the breather is in a range of 2 to 6.

2. The vehicle according to claim 1, wherein the fascia includes an upper panel, an intermediate panel, and a lower panel, and the breather is provided in the intermediate panel provided between the upper panel and the lower panel.

3. The vehicle according to claim 1, wherein the elongated opening extends across a width of the front fascia in a Y-direction, and the upper edge is spaced apart from the lower edge in an X-direction and the Z-direction.

4. The vehicle according to claim 1, wherein the lower assembly includes an inwardly extending flange and a downwardly extending section, a corner between the inwardly extending flange and the downwardly extending section defining the lower edge of the elongated opening.

5. The vehicle according to claim 4, wherein the inwardly extending flange extends substantially orthogonal to the downwardly extending section.

6. The vehicle according to claim 4, wherein the inwardly extending flange extends downwardly relative to the downwardly extending section.

7. The vehicle according to claim 4, wherein the inwardly extending flange extends upwardly relative to the downwardly extending section.

8. The vehicle according to claim 1, wherein the upper assembly includes an angled section and an inwardly extending flange connected to the angled section, a corner between the angled section and the inwardly extending flange defining the upper edge of the elongated opening.

9. The vehicle according to claim 1, wherein the upper edge overhanging the lower edge is configured to collect and direct air into the elongated opening.

10. The vehicle according to claim 1, wherein the breather is configured to collect and direct in an amount that ranges between 959 to about 2144 cubic feet per minute.

* * * * *